US012300893B2

(12) United States Patent
Kong et al.

(10) Patent No.: US 12,300,893 B2
(45) Date of Patent: May 13, 2025

(54) ANTENNA ASSEMBLIES

(71) Applicant: 3M INNOVATIVE PROPERTIES COMPANY, St. Paul, MN (US)

(72) Inventors: Jiwoong Kong, Gyeonggi-do (KR); Jung Ju Suh, Seoul (KR); Charles L. Bruzzone, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 132 days.

(21) Appl. No.: 17/910,107

(22) PCT Filed: Mar. 24, 2021

(86) PCT No.: PCT/IB2021/052453

§ 371 (c)(1),
(2) Date: Sep. 8, 2022

(87) PCT Pub. No.: WO2021/198856

PCT Pub. Date: Oct. 7, 2021

(65) Prior Publication Data

US 2023/0102007 A1 Mar. 30, 2023

Related U.S. Application Data

(60) Provisional application No. 63/002,431, filed on Mar. 31, 2020.

(51) Int. Cl.

| | |
|---|---|
| ***H01Q 21/06*** | (2006.01) |
| ***H01Q 1/38*** | (2006.01) |
| ***H01Q 23/00*** | (2006.01) |

(52) U.S. Cl.
CPC ............. *H01Q 21/061* (2013.01); *H01Q 1/38* (2013.01); *H01Q 23/00* (2013.01)

(58) Field of Classification Search
CPC ........ H01Q 21/061; H01Q 1/38; H01Q 23/00; H01Q 1/40
See application file for complete search history.

(56) References Cited

U.S. PATENT DOCUMENTS

| | | | |
|---|---|---|---|
| 7,576,415 | B2 | 8/2009 | Cha et al. |
| 10,198,677 | B2 | 2/2019 | Forster |

(Continued)

FOREIGN PATENT DOCUMENTS

| | | | |
|---|---|---|---|
| EP | 3621154 | A1 | 3/2020 |
| JP | 2013223000 | A | 10/2013 |
| WO | 2019116718 | A1 | 6/2019 |

OTHER PUBLICATIONS

Simon, N J, Drexler, E S, & Reed, R P. Properties of copper and copper alloys at cryogenic temperatures. Final report. United States. https://doi.org/10.2172/5340308 (Year: 1992).*

(Continued)

*Primary Examiner* — Dimary S Lopez Cruz
*Assistant Examiner* — Austin M Back
(74) *Attorney, Agent, or Firm* — Clifton F. Richardson

(57) ABSTRACT

An electronic assembly includes a circuit board including a plurality of electrically conductive traces, a cover layer disposed on the circuit board, and a plurality of antenna assemblies disposed on a major top surface of the cover layer and exposing the major top surface therebetween. Each of the antenna assemblies includes an antenna and an adhesive layer bonding the antenna to the major top surface of the cover layer. The antenna is electrically coupled to a corresponding different trace in the plurality of traces. The adhesive layers in the antenna assemblies have substantially a same first composition and a same average first thickness. The antennas in the antenna assemblies have substantially a same second composition and a same average second thickness greater than about 5 microns. The electronic assembly can be singulated to provide antenna assemblies. Methods of making the assemblies are also described.

21 Claims, 17 Drawing Sheets

(56) References Cited

U.S. PATENT DOCUMENTS

| | | | | |
|---|---|---|---|---|
| 11,658,405 | B2 * | 5/2023 | Morimoto | H01Q 21/065 343/873 |
| 2009/0261962 | A1 * | 10/2009 | Buck | H01Q 1/2241 29/601 |
| 2017/0229784 | A1 * | 8/2017 | Kitamura | H01Q 9/0414 |
| 2019/0067219 | A1 * | 2/2019 | Lasiter | H01L 23/66 |
| 2019/0303738 | A1 * | 10/2019 | Launay | G06K 19/07745 |
| 2020/0032026 | A1 * | 1/2020 | Nakamura | B32B 15/20 |
| 2020/0103833 | A1 * | 4/2020 | Kita | G04R 60/10 |
| 2021/0257318 | A1 * | 8/2021 | Han | H01L 23/49827 |
| 2021/0350199 | A1 * | 11/2021 | Yamawaki | G06K 19/07722 |

OTHER PUBLICATIONS

P. Gondcharton, B. Imbert, L. Benaissa and M. Verdier, "Copper-copper direct bonding: Impact of grain size," 2015 IEEE International Interconnect Technology Conference, Grenoble, France, 2015, pp. 229-232, doi: 10.1109/IITC-MAM.2 (Year: 2015).*

Du, "Effect of Annealing on Microstructure and Mechanical Properties of Magnetron Sputtered Cu Thin Films", Advances in Materials Science and Engineering, 2015, vol. 2015, pp. 1-8.

International Search Report for PCT Application No. PCT/IB2021/052453, malled on Jun. 15, 2021, 3 pages.

Wang, "The Grain Refinement Mechanism of Electrodeposited Copper", Materials Research Society, 2009, vol. 24, No. 10, pp. 3226-3236.

Zhang, "An Overview of the Development of Antennain-Package Technology for Highly Integrated Wireless Devices", Proceedings of the IEEE, 2019, vol. 107, No. 11, pp. 2265-2280.

* cited by examiner

ANTENNA ASSEMBLIES

CROSS REFERENCE TO RELATED APPLICATIONS

This application is a national stage filing under 35 U.S.C. 371 of PCT/IB2021/052453, filed Mar. 24, 2021, which claims the benefit of Provisional Application No. 63/002,431, filed Mar. 31, 2020, the disclosures of which are incorporated by reference in their entirety herein.

BACKGROUND

Antenna-in-Package (AiP) technology allows an antenna to be integrated in the package of a wireless device.

SUMMARY

The present disclosure relates generally to antenna assemblies, electronic assemblies that include a plurality of antenna assemblies, and methods of making the assemblies.

In some aspects of the present disclosure, an electronic assembly for wireless transmission of information is provided. The assembly includes a circuit board including a plurality of electrically conductive traces; a cover layer disposed on, and substantially co-extensive with, the circuit board, where the cover layer has a major top surface; and a plurality of antenna assemblies disposed on the major top surface of the cover layer and exposing the major top surface therebetween. Each of the antenna assemblies include an antenna for wireless transmission of information at at least one operating frequency in a predetermined frequency range where the antenna is electrically coupled to a corresponding different electrically conductive trace in the plurality of electrically conductive traces, and an adhesive layer bonding the antenna to the major top surface of the cover layer. The adhesive layers in the antenna assemblies have substantially a same first composition and can have a same average first thickness in a direction orthogonal to the circuit board. The antennas in the antenna assemblies have substantially a same second composition and can have a same average second thickness greater than about 5 microns in the direction orthogonal to the circuit board.

In some aspects of the present disclosure, an antenna assembly is provided. The assembly includes a circuit board including an electrically conductive trace; an electronic device mounted on the circuit board and electrically connected to the electrically conductive trace; a cover layer disposed on and substantially encapsulating the electronic device; a copper antenna disposed on the cover layer and electrically connected to the electrically conductive trace; and an adhesive layer disposed on a major top surface of the cover layer and bonding the antenna to the cover layer. The cover layer and the circuit board can be substantially co-extensive with each other in length and width. The copper antenna can have an average grain size of at least about 0.15 microns and an average thickness greater than about 5 microns in a direction orthogonal to the circuit board. The adhesive layer and the circuit board are not co-extensive with each other in at least one of length and width.

In some aspects of the present disclosure, a method of making an antenna assembly is provided. The method includes the steps of providing a circuit board including a plurality of electrically conductive traces and a plurality of electronic devices mounted on the circuit board and electrically connected to the plurality of electrically conductive traces; providing a copper laminate including a copper foil layer permanently bonded to an adhesive layer; disposing substantially co-extensively a cover layer on the circuit board where the cover layer includes an epoxy and has a major top surface; disposing the copper laminate on the cover layer so that the adhesive layer of the copper laminate forms a bond with the major top surface of the cover layer where the bond has sufficiently low peel strength to permit mechanically pulling and peeling of the copper laminate from the cover layer without substantially damaging or leaving residue on the major top surface; forming a plurality of intersecting isolation channels in the copper laminate where the intersecting isolation channels define a plurality of copper assemblies and the isolation channels extend substantially through an entire thickness of the copper laminate so as to substantially isolate the plurality of copper assemblies from a remaining portion of the copper laminate; mechanically pulling and peeling the remaining portion of the copper laminate from the major top surface of the cover layer leaving behind the plurality of copper assemblies where the pulling and peeling of the remaining portion of the copper laminate exposes a corresponding portion of the major top surface of the cover layer; and treating the adhesive layers in the plurality of copper assemblies to form substantially permanent bonds between the copper assemblies and the cover layer.

These and other aspects will be apparent from the following detailed description. In no event, however, should this brief summary be construed to limit the claimable subject matter.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Antenna-in-Package (AiP) is a technology where the antenna of a wireless device is not a separate component within the wireless device but is instead integrated in the device package. AiP technology can be used in a variety of applications where communication modules transmit and/or receive wireless data. However, conventional AiP manufacturing processes are expensive and/or slow. Processes described herein can provide substantially lower raw material and/or processing costs and/or increased production rates compared to conventional AiP processes, according to some embodiments. The processes of the present disclosure can include disposing a coper laminate onto a cover layer of a circuit board, forming (e.g., via laser cutting) a plurality of intersecting isolation channels in the copper laminate to define a plurality of copper assemblies, removing the remaining portion of the copper laminate from the cover layer, and patterning (e.g., via etching) the copper to form an antenna. The result can be an electronic assembly including a plurality of antenna assemblies disposed on the cover layer, or the circuit board can be singulated to provide a plurality of the antenna assemblies. A resulting antenna assembly can include an adhesive layer bonding the antenna to the cover layer where the adhesive layer and the circuit board are not co-extensive with each other in at least one of length and width (e.g., the adhesive layer can have a length and width less than respective lengths and widths of the circuit board).

Figure 1:
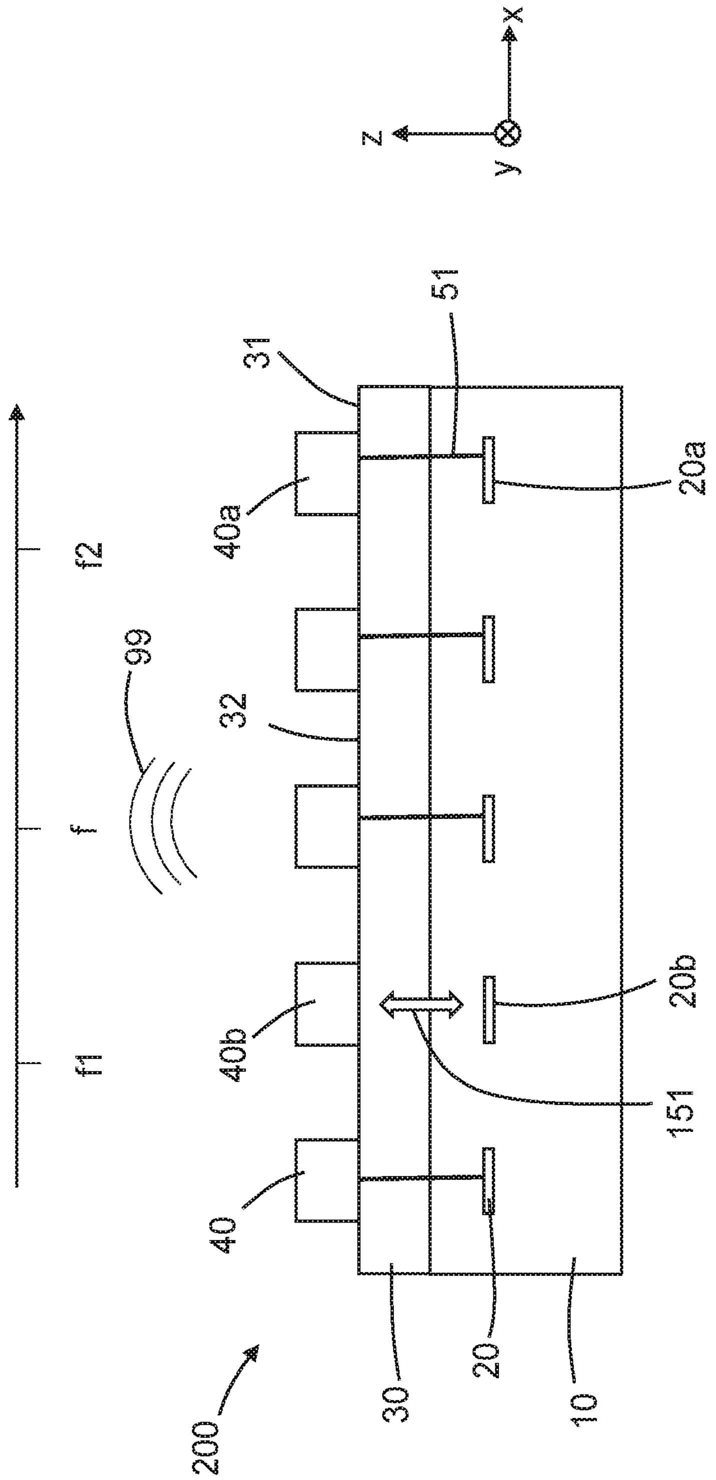
FIG. 1 is a schematic cross-sectional view of an illustrative electronic assembly.
Figure 2:
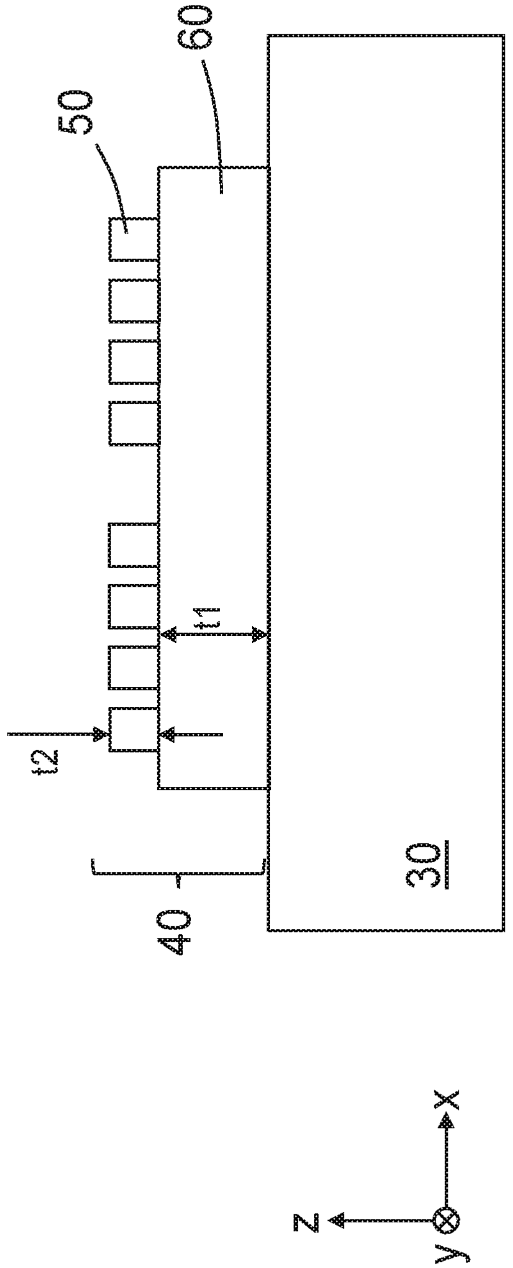
FIG. 2 is a schematic cross-sectional view of an illustrative portion of the assembly of FIG. 1.

FIG. 1 is a schematic cross-sectional view of an illustrative assembly 200 according to some embodiments. FIG. 2 is a schematic cross-sectional view of an illustrative portion of the assembly 200 according to some embodiments. The assembly 200 can be an electronic assembly for wireless transmission of information and/or can be described as an antenna assembly or as an assembly that includes a plurality of antenna assemblies. The assembly 200 includes a circuit board 10 including a plurality of electrically conductive traces 20, and a cover layer 30 disposed on, and substantially co-extensive with, the circuit board 10. The cover layer 30 has a major top surface 31. The assembly 200 further includes a plurality of antenna assemblies 40 disposed on the major top surface 31 of the cover layer 30 and exposing the major top surface therebetween (e.g., portion 32 of the top surface 31 is exposed). Each of the antenna assemblies 40 includes an antenna 50 for wireless transmission of information 99 at at least one operating frequency fin a predetermined frequency range f1 to f2, and an adhesive layer 60 bonding the antenna 50 to the major top surface 31 of the cover layer 30. For each of the antenna assemblies 40, the antenna 50 is electrically coupled (e.g., via lines or wires 51 or wirelessly coupled) to a corresponding different electrically conductive trace in the plurality of electrically conductive traces 20. The adhesive layers 60 in the antenna assemblies 40 have substantially a same first composition and a same average first thickness t1 in a direction (z-direction) orthogonal to the circuit board 10. The circuit board 10 extends in the x- and y-directions and has a thickness in the z-direction in the illustrated embodiment. The antennas 50 in the antenna assemblies 40 have substantially a same second composition and a same average second thickness t2 greater than about 5 microns in the direction (z-direction) orthogonal to the circuit board 10. In some embodiments, the average first thickness t1 is in a range of about 2 microns to about 50 microns, or about 5 microns to about 40 microns. In some embodiments, the average second thickness t2 is in a range of about 5 micron to about 50 microns, or about 6 microns to about 40 microns, or about 7 microns to about 35 microns, or about 8 microns to about 35 microns, or about 10 microns to about 35 microns, for example. The average thickness of a layer is the unweighted mean thickness of the layer, unless indicated differently.

The first and/or second compositions of the different antenna assemblies 40 can be substantially the same by virtue of being formed from a same layer. For example, a same adhesive layer can be used to make the adhesive layers 60 of the different antenna assemblies 40 and a same metal (e.g., copper) layer can be used to make the antennas 50. The adhesive or copper layer can have a constant composition or can have a composition that varies somewhat over the area of the layer due to ordinary manufacturing variations, for example, or other minor variations that do not substantially affect the performance (e.g., electrical conductivity of the copper layer or bonding strength of the adhesive layer) of the layer.

In some embodiments, the predetermined frequency range is from about 20 GHz to about 120 GHz, or from about 20 GHz to about 40 GHz (e.g., f1 can be about 20 GHz and f2 can be about 40 GHz or about 120 GHz).

Figure 3:
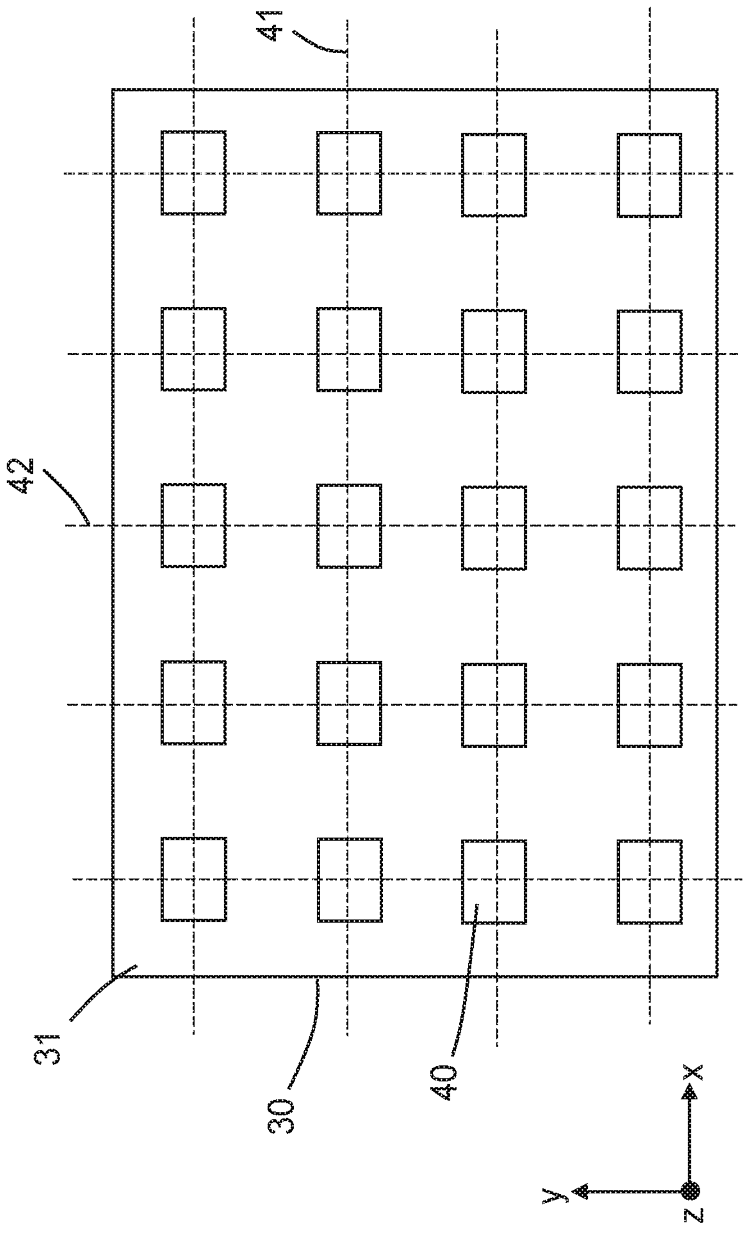
FIG. 3 is a schematic top view of an illustrative assembly.

FIG. 3 is a schematic top view of the assembly 200 according to some embodiments. In some embodiments, the antenna assemblies 40 are arranged in a regular two-dimensional array. In some embodiments, the antenna assemblies 40 are arranged in a regular array of orthogonal rows 41 and columns 42 of the antenna assemblies 40.

In some embodiments, the antenna 50 of at least one of the antenna assemblies 40 is formed on a substrate layer 140 (see, e.g., FIG. 7), where the adhesive layer 60 of the antenna assembly 40 is disposed between the substrate layer 140 and the major top surface 31 of the cover layer 30.

The antennas 50 can be electrically coupled to the traces via a wire or via a wireless coupling. Referring again to FIG. 1, in some embodiments, the antenna of at least one of the antenna assemblies **40*a* is electrically coupled to the corresponding different electrically conductive trace 20*a* via an electrically conductive wire 51. In some embodiments, the antenna of at least one of the antenna assemblies 40*b* is wirelessly coupled to the corresponding different electrically conductive trace 20*b* as schematically indicated by the arrow 151 in FIG. 1. In some embodiments, the antenna of each of the antenna assemblies, or of each of at least a majority of the antenna assemblies, is electrically coupled to the corresponding different electrically conductive trace via an electrically conductive wire 51**. In some embodiments, the antenna of each of the antenna assemblies, or of each of at least a majority of the antenna assemblies, is wirelessly coupled to the corresponding different electrically conductive trace.

Figure 4:
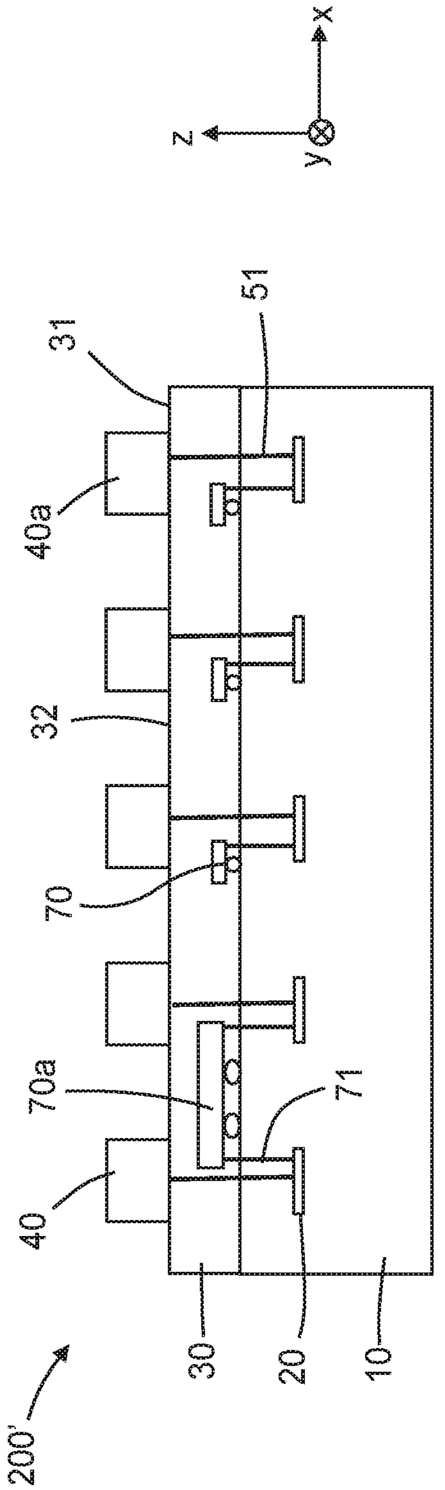
FIG. 4 is a schematic cross-sectional view of an illustrative assembly including a plurality of electronic devices.

FIG. 4 is a schematic cross-sectional view of an illustrative assembly 200' according to some embodiments. Assembly 200' may correspond to assembly 200. In some embodiments, a plurality of electronic devices 70 is mounted on the circuit board 10 and electrically connected (e.g., via lines or wires 71) to the plurality of electrically conductive traces 20.

In some embodiments, the electrically conductive traces in the plurality of electrically conductive traces 20 are electrically isolated from each other. In some such embodiments, at least two of the electrically conductive traces that are electrically isolated from each other are connected to a same device **70*a* as schematically illustrated in FIG. 4**.

In some embodiments, the cover layer 30 includes epoxy. For example, the cover layer 30 can be formed from an epoxy molding compound.

In some embodiments, the first composition includes epoxy. In some embodiments, the first composition includes nitryl rubber. In some embodiments, the first composition includes epoxy and nitryl rubber. For example, an epoxy resin mixed with nitryl rubber has been found to provide a lower initiation temperature and heat exotherm compared with other materials. This can result in decreased processing time and cost. Epoxy with nitryl rubber can provide a weight loss at 288° C. of less than 2.5% (e.g., about 2%) which is typically desired in chip packaging processes. Other useful adhesives include epoxy resin mixed with high molecular weight acrylic resin.

Figure 5:
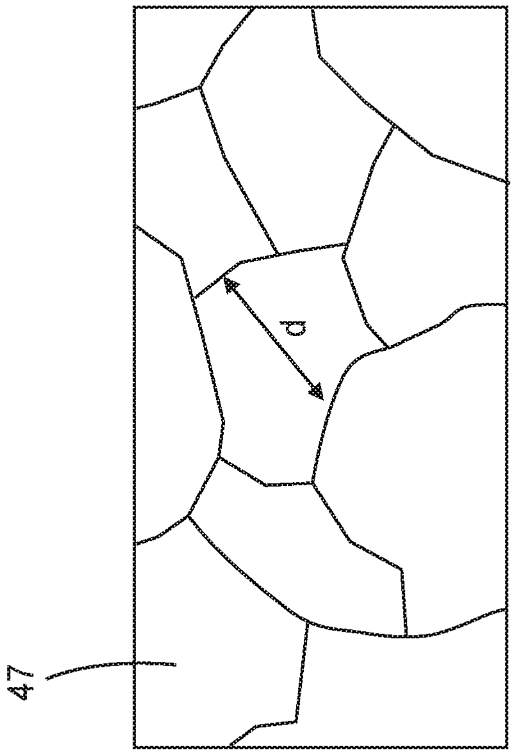
FIG. 5 is a schematic cross-sectional view of an illustrative metal having a plurality of grains.

In some embodiments, the second composition includes a metal such as copper. FIG. 5 is a schematic cross-sectional view of a metal having a plurality of grains 47 having an average grain sized d. In some embodiments, the second composition includes copper. In some embodiments, the copper (e.g., of the second composition and/or of a copper antenna) has an average grain size d of at least about 0.15 microns. The average grain size can vary depending on how the copper was formed and/or processed (e.g., work hardened, rolled, annealed, etc.). The average grain size can be up to about 1 mm, for example. In some embodiments, the average grain size d is at least about 0.3 microns, or at least about 0.5 microns, or at least about 0.8 microns, or at least about 1 micron. In some embodiments, the average grain size is less than about 200 microns, or less than about 100 microns, or less than about 50 microns, or less than about 10 microns. The average grain size of electrodeposited copper can be in a range of about 0.05 microns to about 0.5 microns, depending on the deposition conditions. In some cases, the average grain size of rolled annealed copper is about 2 to about 5 microns, for example. In comparison, the average grain size of sputtered copper is typically about 0.09 microns, or less for thinner sputtered samples. The average grain size can be determined according to the intercept procedure of the ASTM E112-13 test standard, for example.

In one example, an average grain size of a 6 micron thick electrodeposited copper film was about 0.26 microns. For comparison, a 6 micron thick sputtered copper film had an average grain size of about 0.09 microns. In each case, to measure the grain size, the copper film was coated with a polymer and a platinum layer and then cut using a focused ion beam to expose a surface of the copper film in a plane perpendicular to the copper film. The grain size was then measured in the plane perpendicular to the copper film using an intercept procedure.

Figure 6:
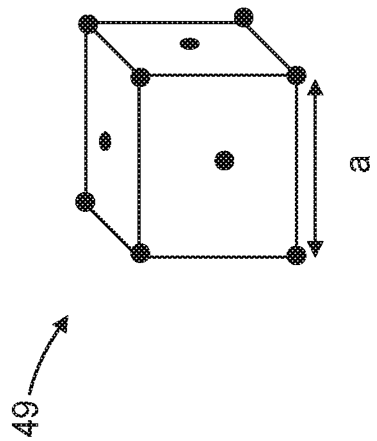
FIG. 6 is a schematic perspective view of an illustrative unit cell.

Metals typically include atoms arranged on a lattice that can be defined in terms or repeating unit cells. FIG. 6 is a schematic perspective view of a unit cell 49 which may be a face-centered-cubic unit cell with an atom at each corner and at a center of each face of the unit cell. The unit cell 49 defines a lattice parameter a. In some embodiments, the copper (e.g., of the second composition and/or of a copper antenna) has a face-center-cubic structure having a lattice parameter a of less than about 3.615 angstroms or less than about 3.614 angstroms. In the context of a lattice parameter, the term "about" can be understood to mean within several ten thousandths of an angstrom. For example, a lattice parameter of about 3.615 angstroms can be 3.6154 angstroms, or 3.615 angstroms, or 3.6146 angstroms. The lattice parameter can depend on how the copper was formed and/or processed and on the purity of the copper (e.g., impurities can occupy positions between the lattice positions of copper atoms which can increase the lattice parameter). The lattice parameter can be determined by X-ray diffraction, for example. As is known in the art, an angular reference material can be incorporated into a sample or applied to a surface of the sample in determining the lattice parameter of the sample by X-ray diffraction. Standard reference materials are available from the National Institute of Standards and Technology (NIST, Gaithersburg, MD), for example. The lattice parameter is determined at room temperature (e.g., about 25° C.), unless indicated differently.

In one example, the lattice parameter of a 6 micron thick electrodeposited copper film was about 3.613 angstroms. For comparison, a 6 micron thick sputtered copper film had a lattice parameter of about 3.617 angstroms. The lattice parameters were measured as follows: A dispersion of laboratory calibrated tungsten angular reference standard in ethanol was applied to the surface of each sample to be examined by X-ray diffraction. The thickness of the tungsten layer on the sample was sufficient to obtain good signal from the tungsten while retaining sufficient signal from the copper layer beneath the tungsten reference to allow adequate diffraction peal profile fitting. Reflection geometry X-ray diffraction data were acquired using a 0.7 mm point collimated Huber 4-circle diffractometer (Huber Diffraktionstechnik GmbH, Rimsting, Germany). The diffractometer used a molybdenum X-ray source operated at generator settings of 40 kV and 25 mA. The scattered radiation was registered by use of a scintillation detector after application of a zirconium Kbeta filter. Data were collected from 36.0 to 42.0 degree (2 Theta) scattering angle range using angular step size of 0.02 degrees and dwell time of 300 seconds per step. Resulting scattering data were processed using the XRD software Jade (v9, MDI, Livermore, CA USA). The background level of each data determined by use of a linear background model. The lattice parameter for the laboratory tungsten angular reference standard had been calibrated using a NIST silicon standard reference material (SRM 640c). The observed peak profiles for the body-centered cubic (BCC) tungsten (220) and (310) peaks and face-centered cubic (FCC) copper (311) peak position were evaluated using a Pearson-7 peak shape model and application of the Jade software peak profile analysis module. The observed tungsten angular reference peaks were used to place the observed copper (311) peak on an absolute scale by linear angular interpolation. The absolute peak positions for the copper (311) was used to calculate the corresponding interplanar spacing for this maximum as well as the copper lattice parameter.

Figure 7:
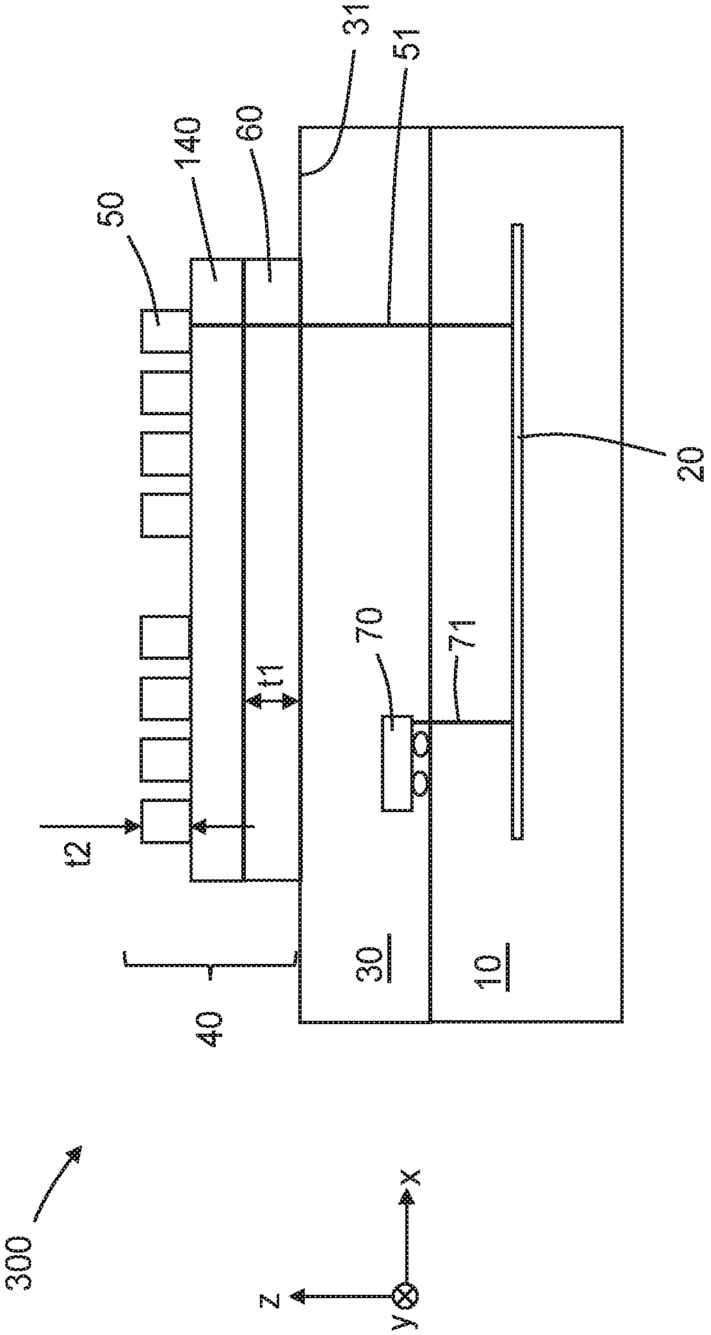
FIGS. 7-9 are schematic cross-sectional view of illustrative antenna assemblies.
Figure 8:
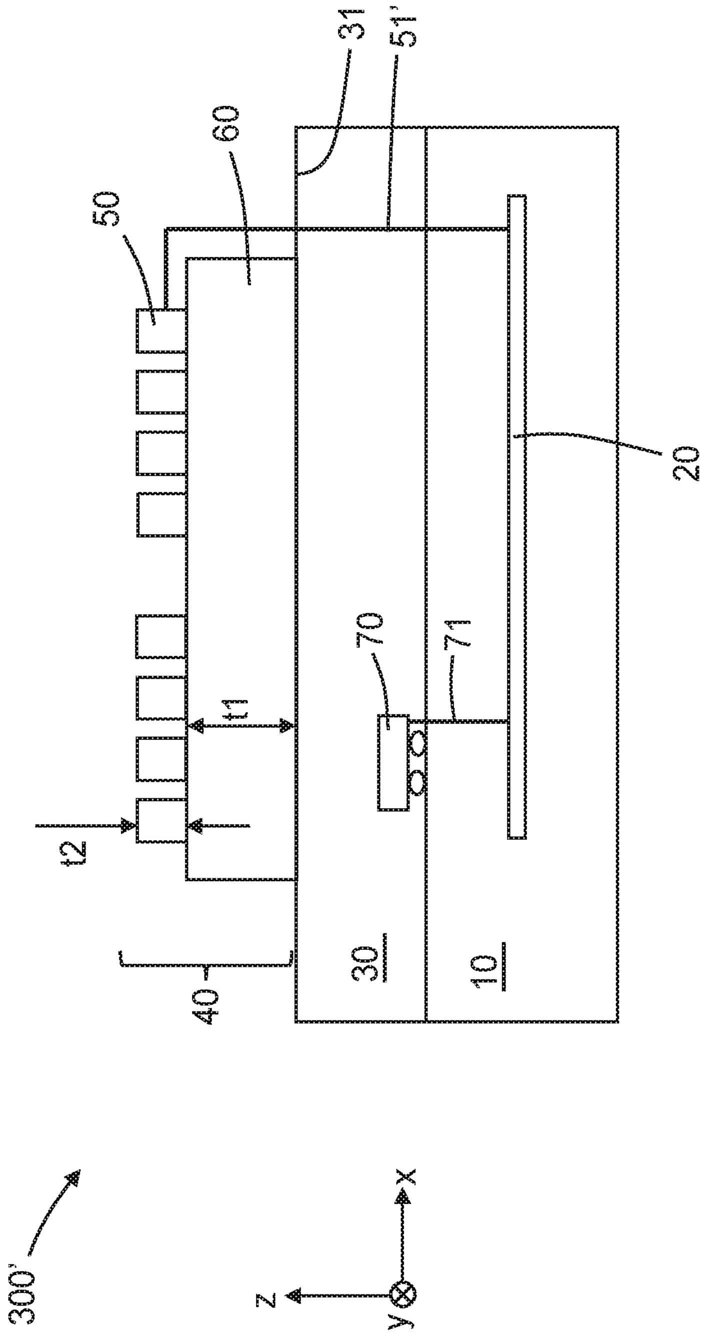
Figure 9:
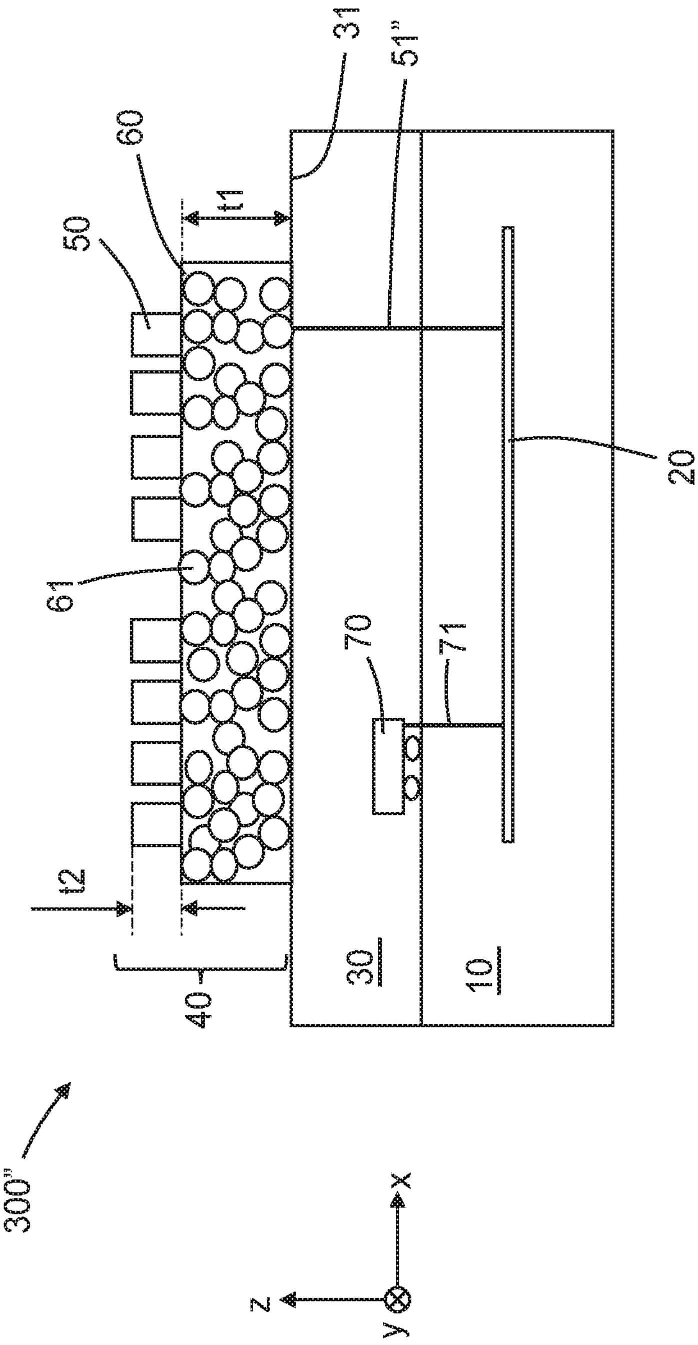
Figure 10:
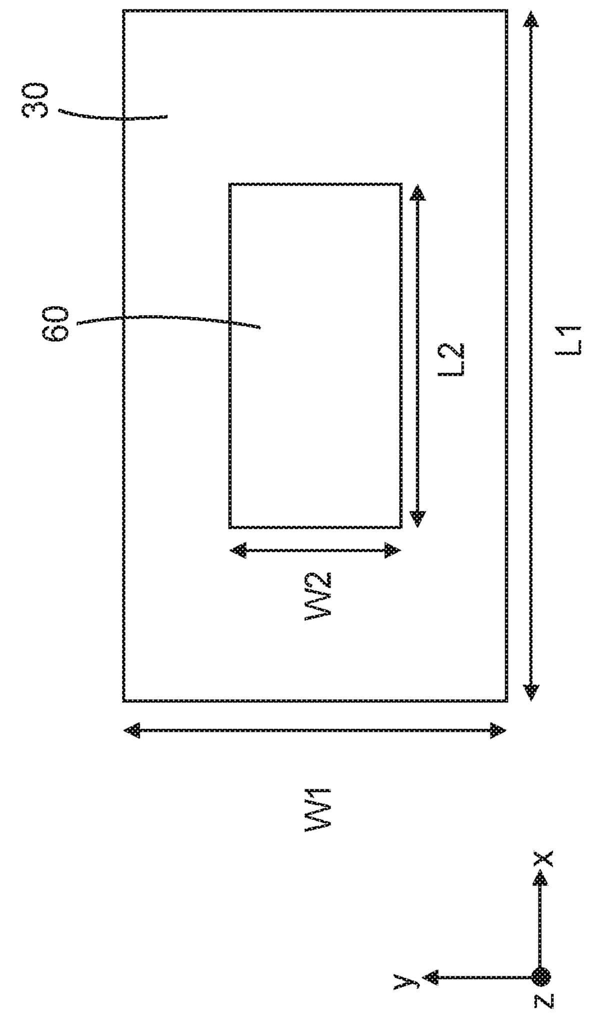
FIG. 10 is a schematic top view of an illustrative adhesive layer disposed on a cover layer.

FIGS. 7-9 are schematic cross-sectional view of illustrative antenna assemblies 300, 300' and 300", respectively. Each of the illustrated antenna assemblies includes a circuit board 10 including an electrically conductive trace 20; an electronic device 70 mounted on the circuit board 10 and electrically connected (e.g., via wire 71) to the electrically conductive trace; a cover layer 30 disposed on and substantially encapsulating the electronic device 70; a copper antenna 50 disposed on the cover layer 30 and electrically connected (e.g., via line or wire 51, or alternatively via wireless coupling (see, e.g., FIG. 1)) to the electrically conductive trace 20; and an adhesive layer 60 disposed on a major top surface 31 of the cover layer 30 and bonding the antenna 50 to the cover layer 30. The cover layer 30 and the circuit board 10 can be substantially co-extensive with each other in length (e.g., dimension in x-direction) and width (e.g., dimension in y-direction). The copper antenna can have an average grain size d of at least about 0.15 microns or the average grain size can be in any of the ranges described elsewhere. Alternatively, or in addition, the copper antenna can include copper having a face-center-cubic structure having a lattice parameter a as described elsewhere. The copper antenna can have an average thickness t2 greater than about 5 microns in a direction (z-direction) orthogonal to the circuit board 10. In some embodiments, the adhesive layer 60 and the circuit board 10 are not co-extensive with each other in at least one of length and width. For example, as schematically illustrated in FIG. 10, which is a schematic top view of an illustrative adhesive layer 60 disposed on a cover layer 30 according to some embodiments, the cover layer 30 has a length L1 and width W1 while the adhesive layer 60 has a length L2 and a width W2 where L2<L1 and/or W2<W1. In some embodiments, L2<L1 and W2<W2, or L2<0.9 L1 and W2<0.9 W2, or L2<0.8 L1 and W2<0.8 W2, or L2<0.7 L1 and W2<0.7 W2.

Layers or elements can be described as substantially co-extensive with each other in length and width if at least about 80% of the length and width of each layer or element is co-extensive with at least about 80% of the length and width of each other layer or element. In some embodiments, for layers or elements described as substantially co-extensive with each other in length and width, at least about 85%, or at least about 90%, or at least about 95% of each layer or element is co-extensive in length and width with at least about 85%, or at least about 90%, or at least about 95% of the respective length and width of each other layer or element. In some embodiments, the cover layer 30 and the circuit board 10 are substantially co-extensive with each other in length and width, but the adhesive layer 60 and the cover layer 30 are not substantially co-extensive with each other in length and width.

In some embodiments, as schematically illustrated in FIG. 7, the antenna 50 is formed on a substrate layer 140 where the adhesive layer 60 is disposed between the substrate layer 140 and the major top surface 31 of the cover layer 30.

In some embodiments, the antenna assembly 300, 300' or 300" includes an electrically conductive line 51, 51' or 51" extending from the trace 20 at least through the cover layer 30. In some embodiments, the copper antenna 50 is electrically connected to the electrically conductive trace 20 via an electrically conductive line 51 extending through the adhesive layer 60 and the cover layer 30 as schematically illustrated in FIG. 7. In some embodiments, the copper antenna 50 is electrically connected to the electrically conductive trace 20 via an electrically conductive line 51' extending around the adhesive layer and through the cover layer as schematically illustrated in FIG. 8. In some embodiments, as schematically illustrated in FIG. 9, the adhesive layer 60 is electrically conductive along a thickness direction (z-direction) thereof, and the copper antenna 50 is electrically connected to the electrically conductive trace 20 via the electrically conductive adhesive layer and an electrically conductive line 51" extending through the cover layer 30. In some embodiments, the adhesive layer 60 is electrically conductive along the thickness direction thereof by virtue of including a plurality of electrically conductive particles 61.

In some embodiments, the antenna 50 is wirelessly coupled to the electrically conductive trace 20 (see, e.g., antenna assembly 40*b* and trace 20*b* depicted in FIG. 1 where the antenna of the antenna assembly 40*b* is wirelessly coupled to the trace 20*b*). For example, in some embodiments, the line 51, 51' or 51" is omitted.

Figure 11A:
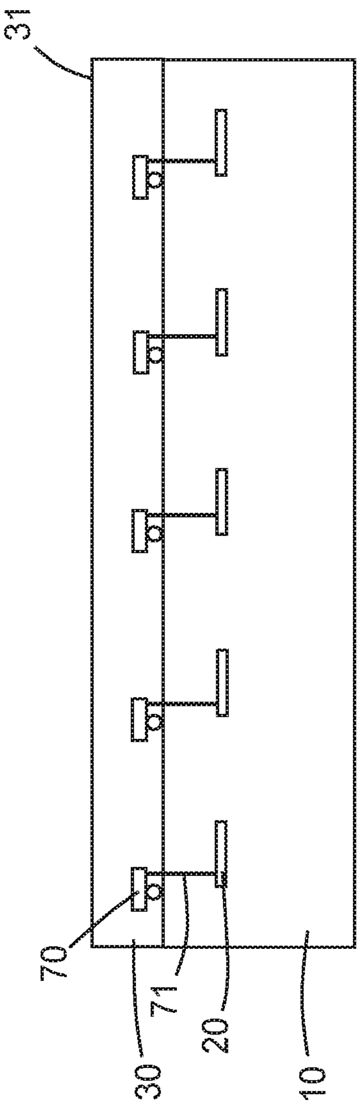
FIGS. 11A-11H schematically illustrate an exemplary method of making an assembly.
Figure 11B:
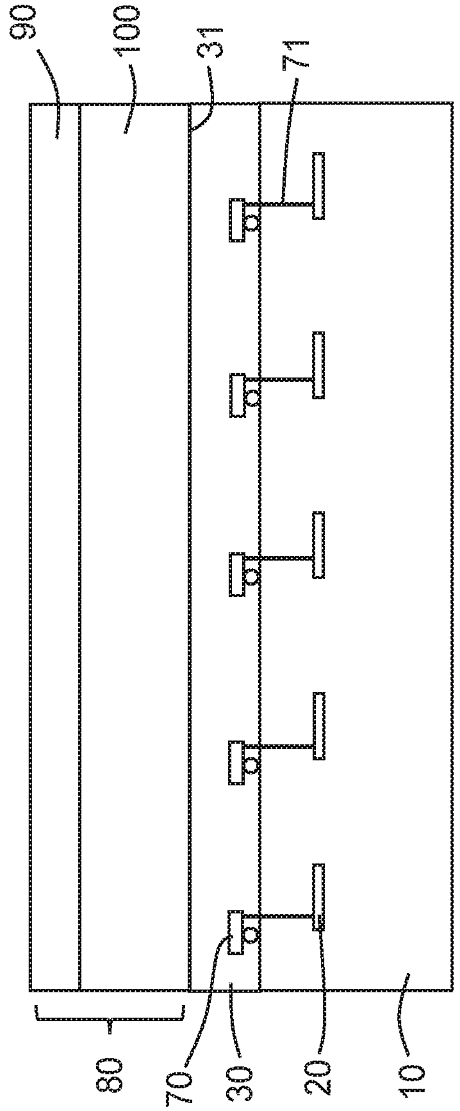
Figure 11C:
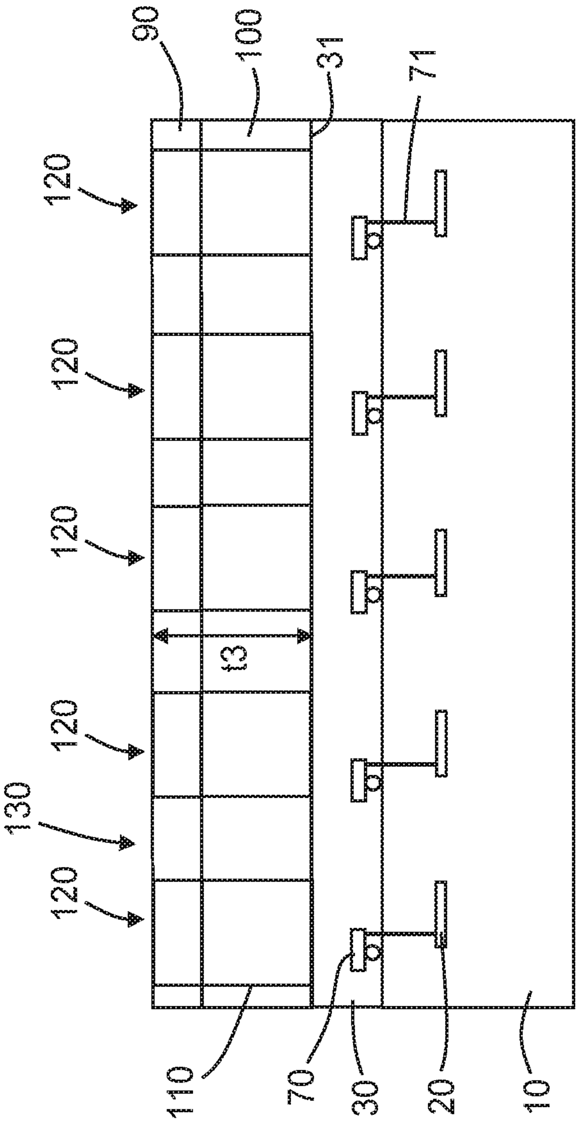
Figure 11D:
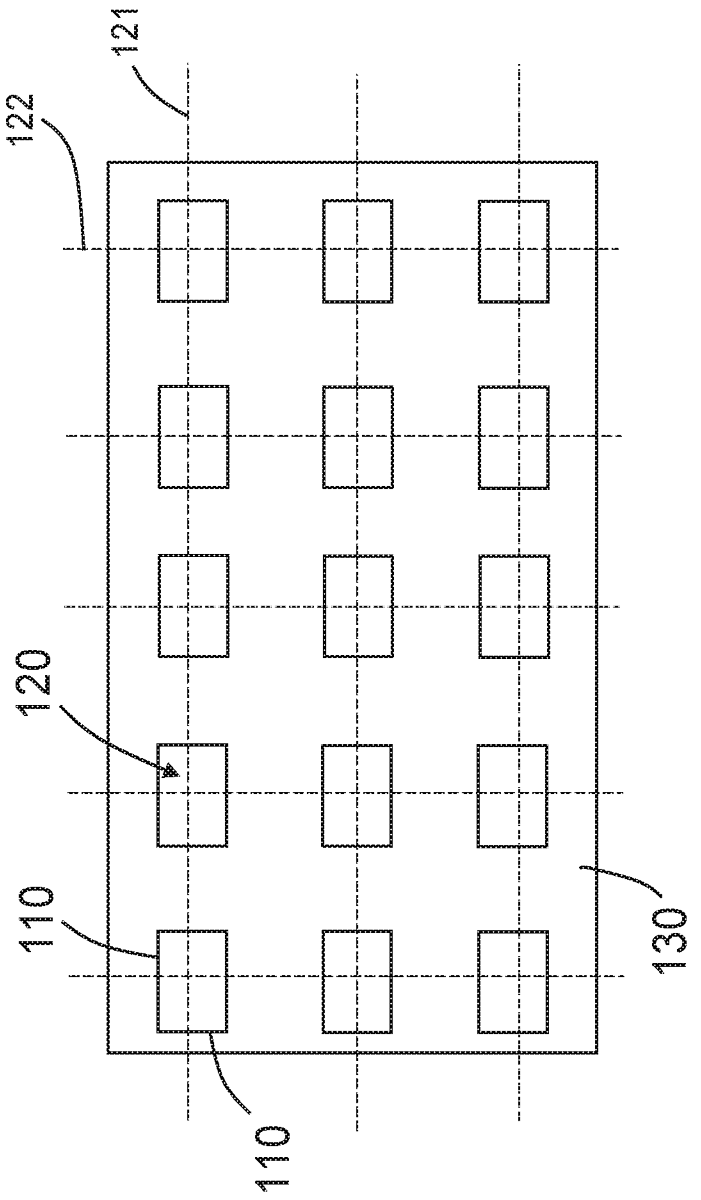
Figure 11E:
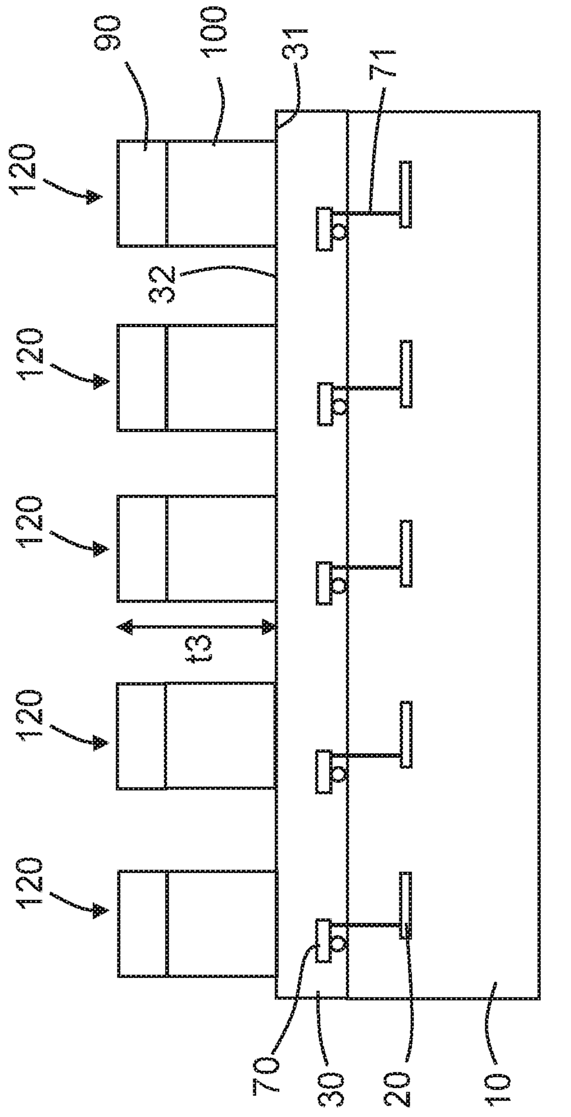
Figure 11F:
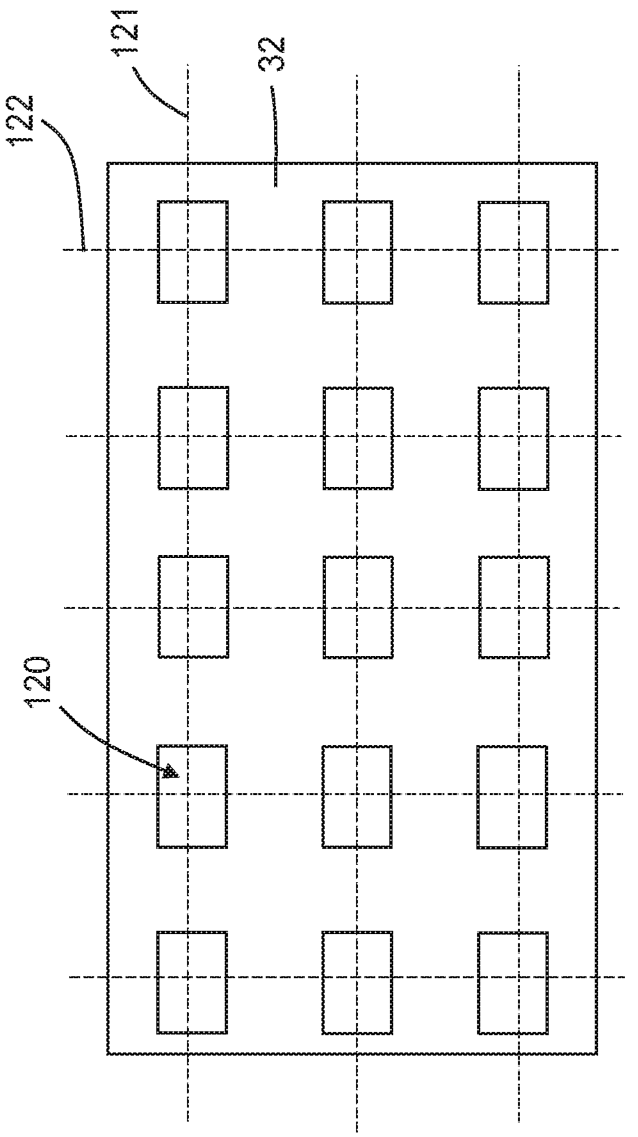
Figure 11G:
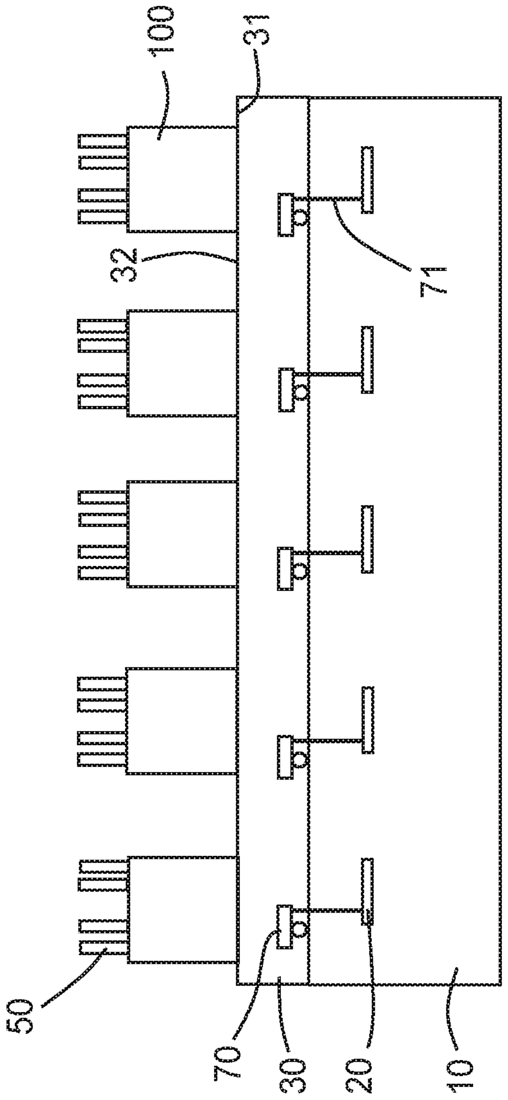
Figure 11H:
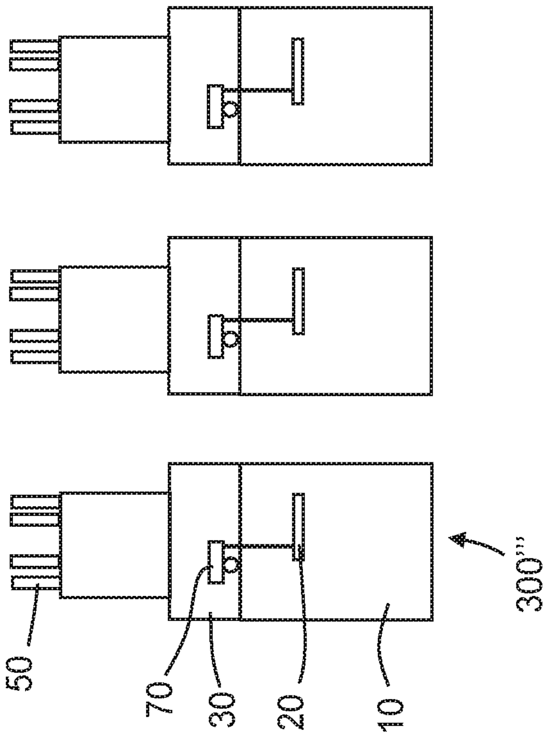

In some embodiments, a method of making an antenna assembly (e.g., 200, 200',300, 300',300") is provided. FIGS. 11A-11H schematically illustrate steps in an illustrative method, according to some embodiments. In some embodiments, a circuit board 10 is provided and a cover layer 30 is disposed on the circuit board 10 as schematically illustrated in FIG. 11A. A copper laminate 80 can be provided and can be disposed on the cover layer 30 after the cover layer 30 has been disposed on the circuit board 10 as schematically illustrated in FIG. 11B. Next, a plurality of intersecting isolation channels 110 can be formed in the copper laminate 80 defining a plurality of copper assemblies 120 as schematically illustrated in the cross-sectional view of FIG. 11C and the top view of FIG. 11D. Next, the remaining portion of the copper laminate 80 can be removed (e.g., by mechanically pulling and peeling) from a major top surface 31 of the cover layer 30 leaving behind the plurality of copper assemblies 120 as schematically illustrated in the cross-sectional view of FIG. 11E and the top view of FIG. 11F. The method can further include the step of patterning the copper layer in each copper assembly to form an antenna 50 for wireless transmission of information as schematically illustrated in FIG. 11G. The resulting assembly can correspond to assembly 200 or 200', for example. In some embodiments, the method further includes singulating the circuit board to form a plurality of antenna assemblies 300''' as schematically illustrated in FIG. 11H. The resulting antenna assemblies 300''' can correspond to antenna assembly 300, 300', or 300", for example. Singulation can be carried out using sawing or dicing methods or other singulation methods known in the art.

In some embodiments, a method of making an antenna assembly includes the steps of providing a circuit board 10 including a plurality of electrically conductive traces 20 and a plurality of electronic devices 70 mounted on the circuit board 10 and electrically connected (e.g., via lines or wires 71) to the plurality of electrically conductive traces 20; providing a copper laminate 80 including a copper foil layer 90 permanently bonded to an adhesive layer 100; disposing substantially co-extensively a cover layer 30 on the circuit board, the cover layer including an epoxy and a major top surface 31; disposing the copper laminate 80 on the cover layer 30 so that the adhesive layer 100 of the copper laminate 80 forms a bond with the major top surface 31 of the cover layer 30, where the bond has sufficiently low peel strength to permit mechanically pulling and peeling of the copper laminate 80 from the cover layer 30 without substantially damaging or leaving residue on the major top surface 31; forming a plurality of intersecting isolation channels 110 in the copper laminate 80, the intersecting isolation channels 110 defining a plurality of copper assemblies 120 which are, in some embodiments, arranged in a regular array of orthogonal rows 121 and columns 122 of copper assemblies, the isolation channels extending substantially through an entire thickness t3 of the copper laminate 80 so as to substantially isolate the plurality of copper assemblies from a remaining portion 130 of the copper laminate 80; mechanically pulling and peeling the remaining portion 130 of the copper laminate from the major top surface 31 of the cover layer 30 leaving behind the plurality of copper assemblies 120, the pulling and peeling of the remaining portion of the copper laminate exposing a corresponding portion 32 of the major top surface 31 of the cover layer 30; treating the adhesive layers 100 (e.g., by raising the temperature to complete a cure of the adhesive) in the plurality of copper assemblies 120 to form substantially permanent bonds between the copper assemblies 120 and the cover layer 30. In some embodiments, the method further includes the step of patterning the copper foil layer 90 in each copper assembly 120 to form an antenna 50 for wireless transmission of information. The antennas can be electrically connected (e.g., via a wired connection or via wireless coupling) to the plurality of electrically conductive traces 20. The method can further include the step of singulating the circuit board to form a plurality of antenna assemblies 300''' (e.g., corresponding to antenna assembly 300, 300' or 300") where each antenna assembly 300''' includes at least one of the antennas 50.

The isolation channels 110 can be formed via laser cutting, for example, or by using other suitable processes known in the art. Patterning the copper foil layer 90 can be carried out via photolithographic processes or other suitable processes known in the art.

A bond having sufficiently low peel strength to permit mechanically pulling and peeling of the copper laminate 80 from the cover layer 30 without substantially damaging or leaving residue on the major top surface 31 means that there is little damage (e.g., no damage visible with the unaided eye) or no damage and that there is little residue (e.g., no residue visible with the unaided eye) or no residue. For example, as schematically illustrated in FIGS. 11E-11F, the adhesive layer 60 was removed from the portion 32 without substantially damaging or leaving residue on the major top surface 31. Layers permanently bonded to one another cannot be readily separated or cannot be separated without damage to one or both of the layers. Layers permanently bonded to one another can be described as having substantially permanent bonds therebetween.

Figure 12:
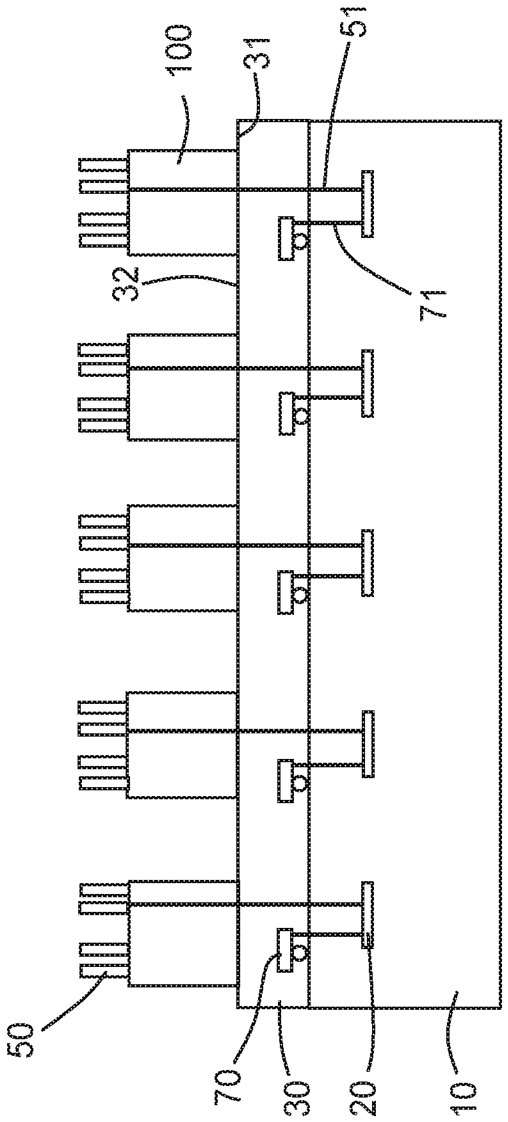
FIG. 12 is a schematic cross-sectional view of an illustrative electronic assembly.

In the embodiments illustrated in FIGS. 11A-11H, the antennas 50 can be electrically coupled to the traces 20 via a wireless coupling, for example. Alternatively, electrically conductive lines or wires 51 (or lines or wires corresponding to wires 51' or 51") can be included between the antennas 50 and the traces 20 as schematically illustrated in FIG. 12 which is a schematic cross-sectional view of an illustrative assembly that can correspond to the assembly of FIG. 11G except for the addition of the lines or wires 51. The lines or wires 51 can be formed by conventional circuit board manufacturing processes, for example (e.g., vias can be etched or otherwise formed through various layers which can then be plated to make the vias electrically conductive). The assembly can be singulated to provide a plurality of assemblies corresponding to assemblies 300''' except for the addition of the lines or wires 51.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations, or variations, or combinations of the specific embodiments discussed herein. Therefore, it is intended that this disclosure be limited only by the claims and the equivalents thereof.

What is claimed is:

1. An electronic assembly for wireless transmission of information, comprising:

a circuit board comprising a plurality of electrically conductive traces;

a cover layer disposed on, and substantially co-extensive with, the circuit board, the cover layer comprising a major top surface; and a plurality of antenna assemblies disposed on the major top surface of the cover layer and exposing the major top surface therebetween such that the exposed portions of the major top surface are exposed through an entire thickness of the plurality of antenna assemblies, each of the antenna assemblies comprising:

an antenna for wireless transmission of information at at least one operating frequency in a predetermined frequency range, the antenna electrically coupled to a corresponding different electrically conductive trace in the plurality of electrically conductive traces; and an adhesive layer bonding the antenna to the major top surface of the cover layer, wherein the adhesive layer in each of the antenna assemblies has substantially a same first composition and a same average first thickness in a direction orthogonal to the circuit board, and wherein the antenna in each of the antenna assemblies has substantially a same second composition and a same average second thickness greater than about 5 microns in the direction orthogonal to the circuit board.

2. The electronic assembly of claim 1, wherein the antenna assemblies are arranged in a regular array of orthogonal rows and columns of the antenna assemblies.

3. The electronic assembly of claim 1, wherein the antenna of at least one of the antenna assemblies is formed on a substrate layer, and wherein the adhesive layer of the antenna assembly is disposed between the substrate layer and the major top surface of the cover layer.

4. The electronic assembly of claim 1, wherein the antenna of at least one of the antenna assemblies is electrically coupled to the corresponding different electrically conductive trace via an electrically conductive wire.

5. The electronic assembly of claim 1, wherein the antenna of at least one of the antenna assemblies is wirelessly coupled to the corresponding different electrically conductive trace.

6. The electronic assembly of claim 1, wherein the predetermined frequency range is from about 20 GHz to about 120 GHz.

7. The electronic assembly of claim 1, wherein the first composition comprises an epoxy.

8. The electronic assembly of claim 1, wherein the second composition comprises copper.

9. The electronic assembly of claim 8, wherein the copper has an average grain size of at least about 0.15 microns.

10. The electronic assembly of claim 8, wherein the copper has a face-center-cubic structure having a lattice parameter of less than about 3.615 angstroms.

11. An antenna assembly comprising:

a circuit board comprising an electrically conductive trace;

an electronic device mounted on the circuit board and electrically connected to the electrically conductive trace;

a cover layer disposed on and substantially encapsulating the electronic device, the cover layer and the circuit board substantially co-extensive with each other in length and width;

a copper antenna disposed on the cover layer and electrically connected to the electrically conductive trace, the copper antenna having an average grain size of at least about 0.15 microns and an average thickness greater than about 5 microns in a direction orthogonal to the circuit board; and an adhesive layer disposed on a major top surface of the cover layer and bonding the antenna to the cover layer, the adhesive layer and the circuit board not co-extensive with each other in at least one of length and width.

12. The antenna assembly of claim 11, further comprising an electrically conductive line extending from the trace at least through the cover layer.

13. The electronic assembly of claim 11, wherein the antenna is wirelessly coupled to the electrically conductive trace.

14. A method of making an antenna assembly, comprising the steps of:

providing a circuit board comprising a plurality of electrically conductive traces and a plurality of electronic devices mounted on the circuit board and electrically connected to the plurality of electrically conductive traces;

providing a copper laminate comprising a copper foil layer permanently bonded to an adhesive layer;

disposing substantially co-extensively a cover layer on the circuit board, the cover layer comprising an epoxy and a major top surface;

disposing the copper laminate on the cover layer so that the adhesive layer of the copper laminate forms a bond with the major top surface of the cover layer, the bond having sufficiently low peel strength to permit mechanically pulling and peeling of the copper laminate from the cover layer without substantially damaging or leaving residue on the major top surface;

forming a plurality of intersecting isolation channels in the copper laminate, the intersecting isolation channels defining a plurality of copper assemblies, the isolation channels extending substantially through an entire thickness of the copper laminate so as to substantially isolate the plurality of copper assemblies from a remaining portion of the copper laminate;

mechanically pulling and peeling the remaining portion of the copper laminate from the major top surface of the cover layer leaving behind the plurality of copper assemblies, the pulling and peeling of the remaining portion of the copper laminate exposing a corresponding portion of the major top surface of the cover layer; and treating the adhesive layers in the plurality of copper assemblies to form substantially permanent bonds between the copper assemblies and the cover layer.

15. The method of claim 14 further comprising the step of patterning the copper foil layer in each copper assembly to form an antenna for wireless transmission of information, the antennas electrically coupled to the plurality of electrically conductive traces.

16. The method of claim 14, wherein forming a plurality of intersecting isolation channels in the copper laminate comprises laser cutting the isolation channels.

17. The method of claim 14, wherein the copper foil layer comprises copper having an average grain size of at least about 0.15 microns.

18. The method of claim 14, wherein the adhesive layer is electrically conductive along a thickness direction thereof.

19. The electronic assembly of claim 1, wherein the adhesive layer is electrically conductive along a thickness direction thereof.

20. The antenna assembly of claim 11, wherein the adhesive layer is electrically conductive along a thickness direction thereof.

21. The antenna assembly of claim 11, wherein the copper antenna comprises copper having a face-center-cubic structure with a lattice parameter of less than 3.614 angstroms.

* * * * *